United States Patent [19]
Boardman et al.

[11] Patent Number: 5,180,398
[45] Date of Patent: Jan. 19, 1993

[54] CELLULOSE OXIDATION BY A PERFLUORINATED HYDROCARBON SOLUTION OF NITROGEN DIOXIDE

[75] Inventors: Franklin Boardman, Englishtown; Lowell Saferstein, Edison, both of N.J.

[73] Assignee: Johnson & Johnson Medical, Inc., Arlington, Tex.

[21] Appl. No.: 630,631

[22] Filed: Dec. 20, 1990

[51] Int. Cl.$^5$ .................................... D06M 13/322
[52] U.S. Cl. ........................................ 8/181; 8/116.1
[58] Field of Search ............................ 8/116.1, 181

[56] References Cited

U.S. PATENT DOCUMENTS

| | | | |
|---|---|---|---|
| 2,423,707 | 7/1947 | Kenyon et al. | 8/116.1 |
| 3,364,200 | 1/1968 | Ashton et al. | 8/116.1 |
| 4,347,056 | 8/1982 | Yasnitsky et al. | 8/116.1 |
| 4,347,057 | 8/1982 | Yasnitsky et al. | 8/116.1 |

OTHER PUBLICATIONS

M. M. Pavlyuchenko et al. "Influence of the Nature of Organic Solvents on Interaction of Cellulos with Nitrogen Tetroxide." *Zh. Prikl, Khim.* vol. 48, No. 8, p. 1822 (1975).

R. H. Hasek et al. "Oxidation of Cellulose", *Ind. & Eng. Chem.*, vol. 41, p. 2 (1949).

P. Morrison and K. Wolf "Substitution Analysis: A Case Study of Solvents," *J. of Haz. Mat.*, vol. 10, p. 189 (1985).

L. E. Manzer ("The CFC-Ozone Issue: Progress on the Development of Alternatives to CFCs," *Science*, vol. 249, p. 31 (1990).

K. Fujie, "Ozone Layer Depletion by Chlorofluorocarbons and Development of Replacements for Them", Kagaku Kogaku [Chem, Eng.], vol. 53, No. 9, p. 62 (1989).

*Primary Examiner*—Prince Willis, Jr.
*Assistant Examiner*—John F. McNally

[57] ABSTRACT

A process for oxidizing cellulose involves reacting the cellulose with a solution of nitrogen dioxide in a perfluorocarbon solvent. In preferred embodiments, the solvent has a boiling point in the range between about 30° C. and 100° C., the nitrogen dioxide concentration in the solution is in the range between about 2% and 12% by weight, and the reactants are maintained at a temperature between about 25° C. and 60° C. during a reaction time fo at least about 7 hours.

10 Claims, 2 Drawing Sheets

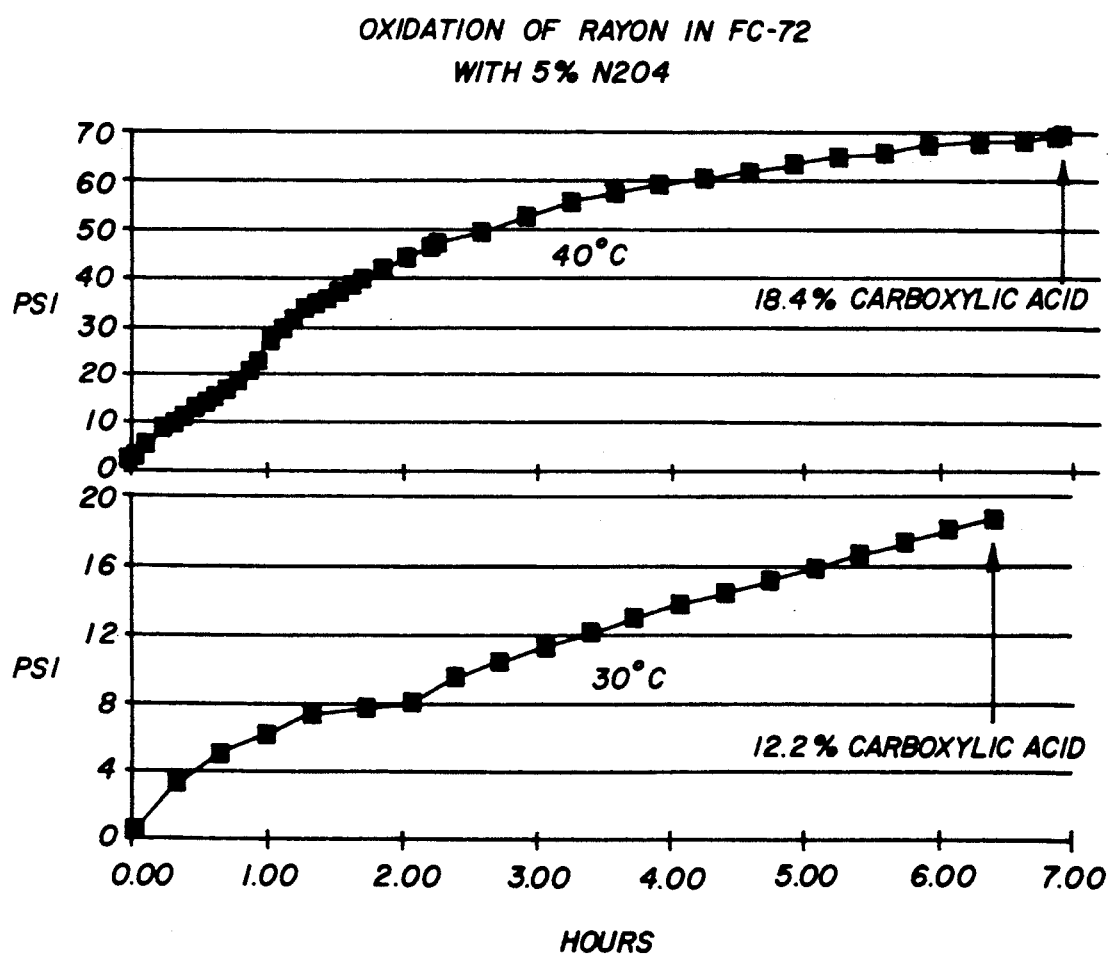

CELLULOSE OXIDATION BY A PERFLUORINATED HYDROCARBON SOLUTION OF NITROGEN DIOXIDE

BACKGROUND OF THE INVENTION

1. Field of the Invention

This invention relates to a process for oxidizing cellulose in a solution of nitrogen dioxide in a prefluorinated hydrocarbon.

2. Description of the Related Art

Oxidized cellulose has been known for many years and has been used for a variety of applications, including as a substitute for tobacco in smoking products. The fact that it is absorbable in the body makes oxidized cellulose an attractive material for medical uses such as sutures, hemostats, and adhesion prevention devices.

For over fifty years, it has been known that cellulose can be oxidized using nitrogen dioxide as the oxidizing agent. Oxidized cellulose became of interest for medical applications after it was discovered that it is soluble in and absorbable by human body fluids, without any obvious ill effects. Early work on processes for cellulose oxidation and using the product for medical applications was done by W. 0. Kenyon and others at Eastman Kodak (see, for example, U.S. Pat. No. 2,423,707, issued Jul. 8, 1947 to Kenyon et al., and R. H. Hasek et al. "Oxidation of Cellulose," *Ind. & Eno. Chem.*, Vol. 41, p. 2 (1949)). In these early oxidation processes, the cellulose was oxidized either with gaseous or liquid nitrogen dioxide or with a solution of nitrogen dioxide in a chlorinated hydrocarbon, such as carbon tetrachloride.

W. H. Ashton et al., U.S. Pat. No. 3,364,200, issued Jan. 16, 1968, disclose a process for preparing oxidized cellulose having improved stability against deterioration. They disclose oxidizing cellulose in nitrogen dioxide in nonaqueous solvents such as Freon 113 ($CCl_2F$-$CClF_2$) and Freon 11 ($CCl_3F$). Chlorinated hydrocarbons and chlorinated fluorocarbons (CFCs) as solvents for nitrogen dioxide in cellulose oxidation were also disclosed by B. G. Yasnitsky, U.S. Pat. No. 4,347,057, issued Aug. 31, 1982.

An article that appeared in the Russian literature (M.M. Pavlyuchenko et al. "Influence of the Nature of Organic Solvents on Interaction of Cellulose with Nitrogen Tetroxide," *Zh. Prikl. Khim.* Vol. 48, No. 8, p. 1822 (1975)) reported on the oxidation of cellulose by nitrogen tetroxide. Specifically, the authors studied the influence on this oxidation of solvents that included alkanes, halogenated saturated hydrocarbons, aromatic compounds, ethers, heterocyclic ethers, and cyclohexane. Based on their data they purported to be able to select the solvent in which cellulose is oxidized at the highest rate. They did not disclose perfluorinated hydrocarbon solvents.

CFCs, which have been shown to be suitable solvents for nitrogen dioxide in cellulose oxidation, have also been shown to pose environmental problems, related to the depletion of the ozone layer at high altitudes. Because CFCs had attained wide application as refrigerants, aerosol propellants, and blowing agents, as well as solvents, a number of studies have sought to find alternative materials that do not have detrimental effects on the environment.

In 1985, scientists at the Rand Corporation reported on efforts to replace CFCs as solvents, particularly CFC-113 and specifically in defluxing applications. P. Morrison and K. Wolf "Substitution Analysis: A Case Study of Solvents," *J. of Haz.Mat.*, Vol 10, p. 189 (1985)). They found no ideal alternatives, and the most effective substitutes for pure CFC-113 were simply combinations of CFC-113 with other solvents.

In a review article by L. E. Manzer ("The CFC-Ozone Issue Progress on the Development of Alternatives to CFCs," *Science*, Vol 249, p. 31 (1990)), CFC-113 is described as a solvent for which "much research has focused on the identification of an acceptable single substitute, but without much success." p. 33 The alternatives disclosed are blends/azeotropes of CFC-113 and two "candidate" hydrochlorofluorocarbons (HCFCs).

A general article concerning ozone depletion by chlorofluorocarbons appeared in the Japanese literature—K. Fujie, "Ozone Layer Depletion by Chlorofluorocarbons and Development of Replacements for Them, " *Kagaku Kogaku* [Chem. Eng.], Vol. 53, No. 9, p. 62 (1989)). Fluorocarbons (FCs), hydrofluorcarbons (HFCs) and HCFCs are mentioned as possible replacements for CFCs. The use of HFC-134a as a replacement for CFC-12 and of HCFC-123 as a replacement for CFC-11 and CFC-12 are disclosed, but no evaluations are made of FCs as replacements for CFCs.

SUMMARY OF THE INVENTION

In accordance with the present invention, a process for oxidizing cellulose comprises the step of reacting the cellulose with an effective amount of a solution of nitrogen dioxide in a perfluorocarbon solvent.

The process avoids the use of environmentally undesirable solvents, such as CFCs, and in their stead uses perfluorocarbons (PFCs) that are odorless and nonflammable and have low values of toxicity and water solubility. In addition, PFCs provide faster oxidation of the cellulose and permit residual nitrogen dioxide to be safely neutralized. Note that in this specification and the appended claims, "nitrogen dioxide" is understood to include both $NO_2$ and the dimer $N_2O_4$.

BRIEF DESCRIPTION OF THE DRAWINGS

FIG. 2 is a graph that depicts the oxidation of rayon by the present process at two different temperatures.

DETAILED DESCRIPTION OF THE INVENTION

Figure 1:
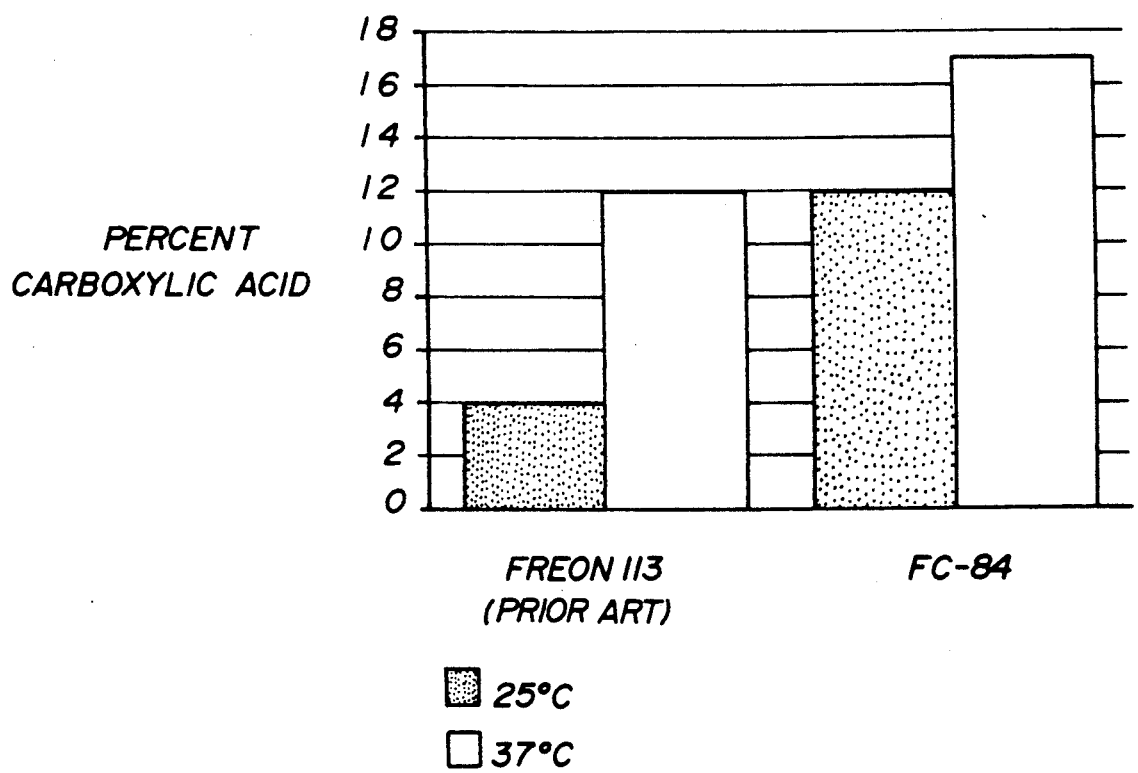
FIG. 1 is a graph that compares results achieved using a solvent of the present invention and a solvent of the prior art.

As it has become clearer that CFCs pose a significant danger to the atmospheric ozone layer, the incentive to replace these materials in their many applications has become stronger. Freon 113 ($CCl_2F$-$CClF_2$) is a CFC that finds widespread use as a solvent, including use as a solvent for nitrogen dioxide in the oxidation of cellulose. The present invention replaces Freon 113 (and alternative solvents, such as carbon tetrachloride) with PFCs in the cellulose oxidation process.

The process for oxidizing cellulose using PFC is substantially the same as the one that has been used before, except of course for the substitution of a PFC as the nitrogen dioxide solvent. This earlier process was described in considerable detail in U.S. Pat. No. 3,364,200, hereby incorporated by reference, and is briefly summarized below.

Cellulose is the starting material of this process, and the term is meant to encompass, in this specification and the appended claims, both naturally occurring cellulosic materials and regenerated cellulose. Suitable cellulosic materials include cotton, starch, wood chips, wood pulp, cellulosic film, methyl cellulose, etc. For many medical applications, regenerated cellulose (i.e., rayon) is preferred, because it has uniform chemical and physical properties. Cellulose comprises a polymer made up of anhydroglucose units. When cellulose is oxidized, the alcoholic group on the number 6 carbon atom of the anhydroglucose unit is oxidized to a carboxyl group. If the number 6 carbon atom on each anhydroglucose unit of the cellulose molecule were oxidized, the carboxyl content would be about 25 $\frac{1}{2}$ percent by weight. For reasons discussed later, such complete oxidation is generally not desirable.

Oxidation is accomplished by first introducing the cellulose—fiber, fabric, gauze, etc.—into a reaction vessel. The cellulose is attached to and wound loosely around an elongated, perforated core. Solvent is introduced into the vessel and circulated through the cellulose, after which nitrogen dioxide is added in the appropriate amount. The cellulose remains immersed in the solution for a period of several hours up to about 24 hours, during which the cellulose becomes oxidized. The duration is determined by the desired degree of oxidation. The liquid is then removed from the vessel and the oxidized cellulose is washed and dried. If it is destined for medical applications, the material is sterilized, generally after it is cut to size and packaged.

The influence of certain organic solvents on cellulose oxidation was studied and then reported in the Russian article referred to earlier (M.M. Pavlyuchenko et al.). In that article, the authors concluded that the rate of cellulose oxidation is determined by the nature of the solvent. The different degrees of cellulose oxidation in nitrogen dioxide organic solvent systems can be attributed to:

1. interaction of the solvent with nitrogen dioxide, leading either to activation of the oxidant (i.e. by saturated hydrocarbons) or combination with the solvent (dioxane).
2. interaction of the solvent with cellulose, influencing diffusion of the free and bound oxidant into the polymer.

The authors found that the activation of the oxidant by nonpolar solvents, such as cyclohexane, depends on an increase in the degree of dissociation $N_{hd} 2O_4 \rightarrow 2NO_2$. Comparison of spectroscopic data for solutions of nitrogen dioxide in saturated and halogenated hydrocarbons with the degree of cellulose oxidation in the corresponding solvent shows that increases of the nitrogen dioxide concentration in the solvents is accompanied by increase of the degree of cellulose oxidation. These authors believe that it is nitrogen dioxide ($NO_2$) which oxidizes cellulose. The degree of dissociation of $N_2O_4 \rightarrow 2NO_2$ in solution depends on the nature of the solvent, its dielectric constant, and its dipole moment. The amount of nitrogen dioxide and the degree of cellulose oxidation decrease as the dielectric constant and dipole moment of the inert solvent increase The authors also believe that formation of $\pi$ complexes of various stabilities by $N_2O_4$ with organic solvents, and differences in the degree of sorption of pure organic solvents by cellulose, can account for the results obtained during oxidation of cellulose in a series of aromatic compounds. Cellulose is not oxidized in ethers and dioxane because of binding of nitrogen dioxide by the solvent molecules and solvation of the reaction centers of the cellulose by the solvents. Partial solvation of these centers by the solvent molecules probably also accounts for the lower degrees of oxidation both in aromatic and in halogenated hydrocarbons in comparison with oxidation in the absence of solvents. There were no PFCs among the solvents they studied.

PFCs form a family of completely fluorinated organic compounds that have a unique combination of properties. They are derived from common organic compounds by replacement of all carbon-bound hydrogen atoms with fluorine atoms. One method of manufacturing these products is electrochemical fluorination. In this process, an organic compound is electrolyzed in liquid hydrogen fluoride The following reaction, showing electrochemical fluorination of octane is typical:

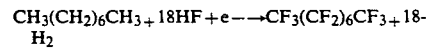

$$CH_3(CH_2)_6CH_3 + 18HF + e^- \rightarrow CF_3(CF_2)_6CF_3 + 18 H_2$$

Since fluorination is complete, the products contain no hydrogen or chlorine This makes PFCs relatively non-toxic and non-flammable and gives them properties that are quite different from the hydrocarbons and CFCs commonly used as degreasing solvents, refrigerants, and aerosol propellants.

PFCs have a number of properties that make them suitable as solvents for cellulose oxidation. They do not react chemically with nitrogen dioxide or with cellulose. In combination with their low dipole moment and dielectric constant, which reduce their interaction with nitrogen dioxide, this permits oxidation to proceed very efficiently, almost as if it were a gas phase. At the same time, they provide a heat sink to cool the reaction. They are insoluble in water, which permits the oxidized cellulose to be conveniently washed with water. They have low toxicity and are non-flammable, reducing safety and environmental concerns. They are also colorless and odorless and have high thermal stability. In addition, they have low heat of vaporization, high density, low viscosity, low surface tension, and low boiling point in relation to their high molecular weights 3M Industrial Chemical Products Division sells a variety of PFCs under the "Fluorinert" trademark.

In selecting a particular PFC for use as a solvent for cellulose oxidation, a key factor is the boiling point. To avoid excessive evaporation, the boiling point should be above about 30° C.; however, solvents with high boiling points are more difficult to remove from the oxidized cellulose. Thus, solvents having boiling points in the range from about 30° C. to about 100° C. are preferred; with the range from 45° C. to 85° C. more preferred. Particularly suitable are commercially available PFCs, such as FC-72[$CF_3(CF_2)_4CF_3$] and FC-84[$CF_3(CF_2)_5CF_3$], both available from 3M; an experimental PFC, KCD-9445 ($C_6F_{12}$), available from DuPont; and mixtures of two or more of these. Mixtures of PFCs are sometimes less expensive, because the manufacturer doesn't have to separate the pure materials. For example, SF-2 (3M) is a mixture of FC-72, FC-84, and higher-boiling-point PFC's.

Although the initial impetus for replacing Freon 113 was to avoid its environmental problems, PFCs provide additional operating advantages. To accomplish a given oxidation level, PFCs permit reduced nitrogen dioxide concentration, lower temperature, and shorter reaction time. FIG. 1 compares the results of rayon oxidation using Freon 113 and FC-84, at temperatures of 25° C.

and 37° C., with 7% nitrogen dioxide concentration and 7 hour reaction time in each case.

As was discussed earlier, 100% oxidation of cellulose corresponds to 25.5% carboxylic acid content. In practice, the preferred degree of oxidation depends on the application that is intended for the material. For medical applications, the material should be bioabsorbable, which requires at least about 10% carboxylic acid content, at which point oxidation is about 40% complete. For sutures, a low oxidation level may be desirable, causing bioabsorption to take place slowly over a period of weeks, during which the sutures are functional. If the material is used for hemostasis, rapid absorption is desirable, with 18%-21% carboxyl content preferred.

Achieving the desired oxidation involves an interplay among the nitrogen dioxide concentration in the solvent and the temperature and duration of the reaction. If the nitrogen dioxide concentration is too low, oxidation is slow and desirable oxidation levels may require times in excess of a day. If the concentration is too high, the reaction generates a lot of heat and becomes hard to control. Furthermore, the nitrogen dioxide may damage the material. A range of nitrogen dioxide concentration of 2-12% by weight is generally preferred, with 5-10% more preferred. Generally, the preferred nitrogen dioxide concentration yields a cellulose: nitrogen dioxide ratio of about 1.

The reaction may be run at atmospheric pressure, but preferably the reaction is run in a closed vessel, with pressure rising as a result of the heat and vapors generated during the reaction.

Running the oxidation reaction at higher temperatures permits faster operation, but the quality of the resultant material suffers (i.e., it becomes stiff and less soft) if temperatures are too high, particularly if the nitrogen dioxide concentration is high, too. The oxidation is preferably run at temperatures between ambient ($\simeq 25°$ C.) and 60° C., with the range between 35° and 50° C. more preferred.

In order to achieve the desired level of oxidation with the preferred nitrogen dioxide concentration and temperature, reaction times are at least about 7 hours. Oxidation using a 5% solution of nitrogen dioxide is shown as a function of time at 30° C. and 40° C. in FIG. 2.

The present invention is further described in the following examples.

EXAMPLE 1

Preparation of ORC in SF-2 Solvent in a Pressure Reactor

We placed 16.18 grams of rayon cloth into a pressure vessel (Parr Reactor), laid a Teflon screen over the cloth to prevent it from rising up and becoming entangled in the stirring blades of the reactor, and added 323.6 grams of SF-2 solvent. SF-2 is a perfluorocarbon mixture available from the 3M Company. The mixture is a colorless, clear, and odorless liquid, having a boiling point range between 70° C. and 90° C. and a specific gravity of 1.7. The solvent is very inert to nitrogen dioxide We purged the reactor with nitrogen gas for 3 minutes to displace the air, added 12.13 grams of nitrogen dioxide liquid chilled to 10° C., and bolted the top onto the pressure vessel. The ratio of solvent: cloth: $N_2O_4$ was 20: 1:0.75. We started the overhead stirrer and heated the reactor to 38° C. We held the temperature constant for 17 hours, as the pressure rose to a maximum of 66 psi. We then cooled the reactor to room temperature, vented the pressure into a caustic trap to neutralize any nitrogen oxide gases in the solvent, and unbolted the top of the pressure vessel. We removed the cloth, placed it in 200 ml of fresh SF-2 solvent and stirred slowly for 10 minutes. After repeating the washings a second time with fresh SF-2 solvent, we placed the cloth into 200 ml of a 50:50 v/v isopropyl alcohol: water mixture and stirred slowly for 10 minutes. We repeated this alcohol water wash for a total of 5 washes. We then placed the cloth into 200 ml of 100% isopropyl alcohol and stirred slowly for 10 minutes to remove water. After repeating this 100% alcohol wash for a total of 3 washes, we removed the cloth and allowed it to air dry. The dry cloth was cut into pieces weighing about 1 gram each and dried further at 70° C. for 1 hour in an oven. The dried cloth was weighed and then dissolved in 10 ml of 0.5N sodium hydroxide solution and diluted with 100 ml of distilled water. The solution was titrated with standard 0.1 N HCl to a phenolphthalein end point. A blank was also run using only the sodium hydroxide solution, with no cloth added. The carboxylic acid content of the cloth, calculated from the back titration of the sodium hydroxide solution, was 22.1%.

EXAMPLE 2

Oxidation of Rayon in FC-84 Perfluorocarbon under Pressure

We placed 15.98 grams of rayon cloth into a pressure vessel, covered the cloth with a Teflon screen, and added 319.6 grams of FC-84 solvent, which is another 3M perfluorocarbon. This fully fluorinated hydrocarbon is a colorless, odorless liquid that has a boiling point of 80° C. and a specific gravity of 1.73 and is very inert to nitrogen dioxide We purged the reactor with nitrogen gas for 3 minutes to remove the air, added 23.97 grams of nitrogen dioxide prechilled to 10° C., and secured the top onto the pressure vessel The concentration of nitrogen dioxide was 7% and the ratio of solvent cloth $N_2O_4$ was 20:1:1.5. We stirred the solution with an overhead stirrer and heated to 25° C., which we maintained for 7 hours, as the pressure rose to a maximum of 10.0 psi.

We then vented the reactor and cooled to room temperature. We removed the cloth and washed it 5 times in 200 ml of 50:50 isopropyl alcohol: water (v/v), and 3 times in 200 ml of 100% isopropyl alcohol. After air drying, we cut from the cloth two pieces of about 1 gram each and dried them further in an oven at 70° C. for 1 hour. We then weighed each piece of dry cloth and dissolved them in 0.5N sodium hydroxide. We back titrated the sodium hydroxide with 0.1N HCl to calculate that the carboxylic acid content of the cloth was 11.3%.

EXAMPLE 3

Oxidation of Rayon in Freon 113 (Comparison Test)

We repeated Example 2 using Freon 113 as a solvent, with the same ratio of solvent: cloth: $N_2O_4$ and the same temperature and time of reaction. With Freon 113 as the solvent, the maximum pressure developed was only 3.5 psi and the cloth produced had a carboxylic acid content of 4.1%. This demonstrates that FC-84 can bring about faster oxidation than Freon 113.

EXAMPLE 4

Oxidation of Rayon in FC-72 Perflourocarbon Under Pressure

We placed 16.64 grams of rayon cloth into a pressure vessel, covered the cloth with a Teflon screen and added 332.8 grams of FC-72 solvent. After flushing with nitrogen gas for 3 minutes, we added 17.52 grams of nitrogen dioxide chilled to 10° C. and attached the top to the pressure vessel. The concentration of $N_2O_4$ was 5.0% and the ratio of solvent: cloth: $N_2O_4$ was 20:1:1.05. We turned on the stirrer, brought the temperature to 30° C., and allowed the reaction to run for 7 hours, as the pressure rose to a maximum of 18.7 psi. The vessel was then cooled to room temperature and vented. The cloth was removed and washed in 200 ml of 50:50 isopropyl alcohol: water (v/v). The washings were repeated for a total of 3 times; then the cloth was washed 2 times in 200 ml of 100% isopropyl alcohol and air dried. The cloth was titrated and found to have a carboxylic acid content of 12.2%.

EXAMPLE 5

Oxidation of Rayon in Fluorinert FC-72 at Atmospheric Pressure

Into a 50 ml round bottom flask equipped with a cold condenser was placed 1.26 grams of knitted rayon fabric. Into 15.12 grams of FC-72 solvent chilled in an ice bath we dissolved 3.78 grams of nitrogen dioxide liquid. We added the nitrogen dioxide solution to the rayon fabric and held the flask at 25° C for 22 hours. The concentration of nitrogen dioxide in FC-72 was 20%. Bubbles of gas were observed rising from the reaction and brown fumes of nitrogen dioxide gas appeared above the solution in the flask. At the end of 22 hours, the solvent was added to dilute aqueous sodium hydroxide to neutralize the excess nitrogen dioxide, so that the solvent could be reused. The cloth was removed from the flask and added to 50 ml of a 50:50 isopropyl alcohol: water (v:v) solution and allowed to stir for 10 minutes. The cloth was removed and washed a second time in fresh 50:50 solvent for 10 minutes. This was repeated for a total of 5 washes. The cloth was then washed in 50 ml of 100% isopropyl alcohol for 10 minutes and allowed to air dry. The dry cloth was placed in an oven at 70° C. for 1 hour to thoroughly dry it, then it was weighed and dissolved in 10 ml of 0.5N sodium hydroxide. The solution was titrated with standard 0.1N HCl, and the cloth was found to have a carboxylic acid content of 17.6 weight percent.

EXAMPLE 6

Oxidation of Rayon in Fluorinert FC-84 with Nitrogen Dioxide

The apparatus was the same as in Example 5. Into the round bottom flask was placed 0.87 grams of knitted rayon fabric and 10.44 grams of Fluorinert FC-84 in which had been dissolved 2.61 grams of nitrogen dioxide. The concentration of nitrogen dioxide in the solvent was 20%. The cold condenser was attached to the top of the round bottom flask and the flask was immersed in a 25° C. water bath and held there for 22 hours, after which the cloth was removed and washed as in Example 5. The cloth was dried in an oven at 70° C. for 1hour then titrated for carboxylic acid content. This cloth was found to have a carboxylic acid content of 20.5%.

We claim:

1. A process for oxidizing cellulose comprising the step of reacting the cellulose with an effective amount of a solution of nitrogen dioxide in a perfluorocarbon solvent.

2. The process of claim 1 in which the solvent has a boiling point in the range between about 30° C. and about 100° C.

3. The process of claim 2 in which the solvent has a boiling point in the range between about 45° C. and about 85° C.

4. The process of claim 1 in which the solvent is selected from a group consisting of $CF_3(CF_2)_4CF_3$, $CF_3(CF_2)_5CF_3$, $C_6F_{12}$ and mixtures thereof.

5. The process of claim 1 in which the nitrogen dioxide concentration in the solution is in the range between about 2% and about 12% by weight.

6. The process of claim 5 in which the nitrogen dioxide concentration in the solution is about 5–10%.

7. The process of claim 1 in which the reactants are maintained at a temperature in the range between about 25° C. and about 60° C. during the reaction.

8. The process of claim 7 in which the reactants are maintained at a temperature in the range between about 35° C. and about 50° C. during the reaction.

9. The process of claim 1 in which the reaction is continued for at least about 7 hours.

10. The process of claim 1 in which the reaction is continued until oxidation is at least about 40% complete.

* * * * *